(12) United States Patent
Yang et al.

(10) Patent No.: US 10,128,705 B2
(45) Date of Patent: Nov. 13, 2018

(54) ELECTRIC MOTOR HEATING/COOLING SYSTEM

(71) Applicant: Tesla, Inc., Palo Alto, CA (US)

(72) Inventors: Bozhi Yang, Santa Clara, CA (US); Tomas Vianna Martins, San Francisco, CA (US); Scott Michael Graves, Felton, CA (US); Ethan Swint, Sunnyvale, CA (US); Eric Bellemare, Mountain View, CA (US); Lev Fedoseyev, San Jose, CA (US); Benjamin Dellal, San Francisco, CA (US); Leif E. Olsen, Menlo Park, CA (US); Alexander Hain, Frankfurt Höchst (DE)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 15/827,435

(22) Filed: Nov. 30, 2017

(65) Prior Publication Data
US 2018/0091012 A1    Mar. 29, 2018

Related U.S. Application Data

(63) Continuation of application No. PCT/US2017/036285, filed on Jun. 7, 2017.
(Continued)

(51) Int. Cl.
H02K 9/00    (2006.01)
H02K 1/32    (2006.01)
(Continued)

(52) U.S. Cl.
CPC .............. H02K 1/32 (2013.01); H02K 1/16 (2013.01); H02K 1/274 (2013.01); H02K 3/12 (2013.01);
(Continued)

(58) Field of Classification Search
CPC .. H02K 9/19; H02K 5/20; H02K 1/20; H02K 1/32; H02K 9/20; H02K 9/005; H02K 9/00
(Continued)

(56) References Cited

U.S. PATENT DOCUMENTS 3,629,627 A * 12/1971 Dafler ..................... H02K 9/19
                                                          310/44
6,191,511 B1    2/2001 Zysset
(Continued)

FOREIGN PATENT DOCUMENTS

DE         4333613 A1      4/1994
DE      102013020332 A1    7/2014
(Continued)

OTHER PUBLICATIONS

European Patent Office; International Search Report and Written Opinion; International Application No. PCT/US2017/036285; dated Jul. 17, 2017; 14 pgs.
(Continued)

Primary Examiner — Thanh Lam
(74) Attorney, Agent, or Firm — Garlick & Markison; Bruce E. Garlick

(57) ABSTRACT

An electric motor includes a case, a stator that includes a stator laminaiton and end-windings, a rotor coupled to the case via at least one rotor bearing. The rotor includes a hollow cylindrical body, a first shaft portion, and a second shaft portion. The hollow cylindrical body includes an inner wall, an outer wall, a first distal end, and a second distal end. The first shaft portions couples to the first distal end and the second shaft portion couples to the second distal end. The second shaft portion includes a fluid feed tube formed therewith having a fluid receive end and a fluid feed end, the fluid feed end extending to a central inner portion of the
(Continued)

hollow cylindrical body. A plurality of fluid exit ports adjacent the first distal end and the second distal end of the hollow cylindrical body spray fluid onto components of the stator.

20 Claims, 7 Drawing Sheets

Related U.S. Application Data

(60) Provisional application No. 62/346,741, filed on Jun. 7, 2016.

(51) Int. Cl.
    *H02K 5/173*     (2006.01)
    *H02K 7/08*     (2006.01)
    *H02K 11/40*     (2016.01)
    *H02K 9/193*     (2006.01)
    *H02K 9/197*     (2006.01)
    *H02K 1/16*     (2006.01)
    *H02K 1/27*     (2006.01)
    *H02K 3/12*     (2006.01)
    *H02K 5/16*     (2006.01)
    *H02K 11/00*     (2016.01)

(52) U.S. Cl.
    CPC ............ *H02K 5/16* (2013.01); *H02K 5/1732* (2013.01); *H02K 7/083* (2013.01); *H02K 9/193* (2013.01); *H02K 9/197* (2013.01); *H02K 11/40* (2016.01); *H02K 11/00* (2013.01)

(58) Field of Classification Search
    USPC ................................. 310/52–59, 61–63, 60 A
    See application file for complete search history.

(56) References Cited

U.S. PATENT DOCUMENTS

| | | | |
|---|---|---|---|
| 6,329,731 B1 | 12/2001 | Arbanas | |
| 7,156,195 B2 | 1/2007 | Yamagishi | |
| 8,970,075 B2 * | 3/2015 | Rippel | H02K 1/20 310/54 |
| 2003/0057783 A1 | 3/2003 | Melfi | |
| 2010/0001602 A1 | 1/2010 | Bossaller et al. | |
| 2010/0127585 A1 | 5/2010 | Fee et al. | |
| 2010/0320850 A1 | 12/2010 | Lemmers, Jr. et al. | |
| 2011/0309698 A1 | 12/2011 | Kirkley, Jr. et al. | |
| 2012/0104884 A1 | 5/2012 | Wagner et al. | |
| 2012/0153718 A1 | 6/2012 | Rawlinson et al. | |
| 2013/0071057 A1 | 3/2013 | Fischer et al. | |
| 2016/0099633 A1 | 4/2016 | Yoshinori et al. | |

FOREIGN PATENT DOCUMENTS

| | | |
|---|---|---|
| DE | 102013219186 A1 | 6/2015 |
| EP | 1114939 A1 | 7/2011 |
| EP | 2549626 A1 | 1/2013 |
| EP | 2667486 A2 | 11/2013 |
| EP | 2977254 A1 | 1/2016 |
| JP | 2000316251 A | 11/2000 |
| JP | 4447410 B2 | 4/2010 |
| JP | 2010172132 A | 8/2010 |
| WO | 2012176052 A2 | 12/2012 |
| WO | 2013136405 A1 | 9/2013 |

OTHER PUBLICATIONS

European Patent Office; International Search Report and Written Opinion; International Application No. PCT/US2017/036290; dated Jul. 25, 2017; 12 pgs.

European Patent Office; International Search Report and Written Opinion; International Application No. PCT/US2017/036300; dated Sep. 15, 2017; 14 pgs.

* cited by examiner

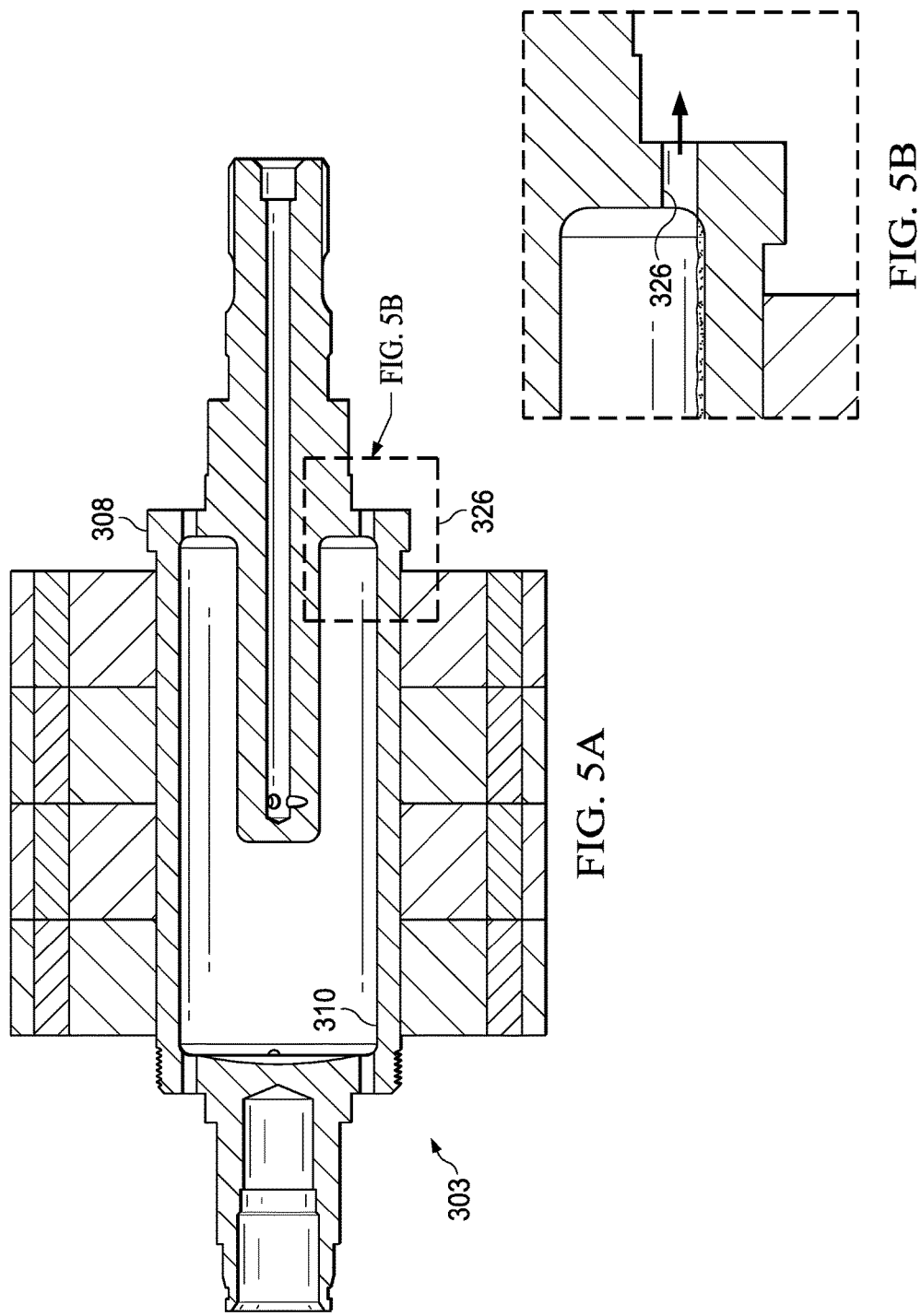

ELECTRIC MOTOR HEATING/COOLING SYSTEM

CROSS-REFERENCE TO RELATED APPLICATION

The present application claims priority claims priority pursuant to 35 U.S.C. § 120 and U.S.C. § 365(c) as a continuation of International Application Ser. No. PCT/US2017/036285, entitled "ELECTRIC MOTOR COOLING SYSTEM', filed 7 Jun. 2017, which claims priority pursuant to 35 U.S.C. § 119(e) to U.S. Provisional Patent Application No. 62/346,741, entitled "ELECTRIC MOTOR COOLING SYSTEM AND ROTOR DISCHARGE PROTECTION', filed 7 Jun. 2016, both of which are incorporated herein by reference in their entirety and made part of the present application for all purposes.

BACKGROUND

Technical Field

The present invention relates to electric motors; and more particularly to the management of the temperature of an electric motor.

Description of Related Art

Electric motors can generate considerable heat, especially by the traction motor of a vehicle where size and weight constraints are coupled with the need for high power output. Electric motor overheating causes the motor winding insulation to deteriorate quickly. For every 10-degree Celsius rise in electric motor temperature, insulation life is cut in half. Another issue caused by overheating is that permanent magnets in the rotor lose their magnetic properties as they overheat, resulting in a loss of efficiency. For induction motors, an increase in temperature of their copper windings reduces efficiency of the induction motor—copper electrical resistivity increases 4% for every 10-degree Celsius temperature increase. Thus, it is important to cool the internal motor components (e.g., rotor) as well as the outer motor components (e.g., case, stator). The electric motor cooling system must operate efficiently over large variations in ambient operating environment as the electric motor may be subjected to a wide range of ambient temperatures, humidity levels, and/or dust/dirt levels.

A number of different approaches have been taken to meeting the cooling demands placed on a vehicle's electric motor. For example, U.S. Pat. No. 6,191,511 discloses using a closed loop, liquid cooling circuit in an attempt to achieve a temperature balance within the motor, the cooling circuit passing the coolant (typically a fluid such as oil, e.g., automatic transmission oil or similar type oil) through both the stator and a hollow rotor shaft. Within the hollow rotor shaft is a stationary injection tube, the injection tube fixed to a stator flange. The fluid is pumped through the injection tube to the end of the rotor shaft where it is passed between the cavity of injection tube and the hollow rotor shaft. The fluid then passes through a cylindrical cooling chamber extending over the length and periphery of the stator before cooling the stator structure and being returned to the injection tube.

U.S. Pat. No. 6,329,731 discloses a liquid cooled electric motor in which one of the main elements of the planetary gear drives the displacement pump of a cooling circuit. Fluid is pumped through a stationary tube about which the hollow rotor shaft rotates. The fluid then passes between the stationary tube and the hollow rotor shaft before passing through a radiator incorporated into the motor and planetary gear casing.

U.S. Pat. No. 7,156,195 discloses an electric motor in which fluid is collected within the reduction gear case, not the motor case, thus avoiding deterioration and alteration of the motor magnets. The fluid from the reservoir is pumped through the end of a passage in the drive shaft where it flows toward the motor. Some of the fluid is sprayed onto the reduction gears while the rest of the fluid is pumped between the drive shaft and the reduction gear shaft and the motor output shaft.

These prior solutions had a number of shortcomings. They failed to address the differing heat production locations along the length of the rotor. More heat tends to be generated in the central portion of the rotor, as compared the end or distal portions of the rotor. The prior art solutions tended to cool using a fluid that flowed from one distal portion of the rotor to another distal portion of the rotor, causing a heat gradient from end to end and end to rotor center. Further, the prior art solutions included a number of relatively complex parts, resulting in relatively high production costs and a relatively high failure rate.

Another problem with the operation of battery powered electric vehicles is that the powering batteries do not operate efficiently at low temperatures. As the deployment of electric vehicles proliferates, many are used in environments having cold winters and/or in locations that are cold at all times. In order to keep the electric vehicles operating at a reasonable efficiency level, the electric vehicles must be stored inside or use externally powered battery heaters to keep the batteries at an acceptable operating temperature. This solution, of course, does not work when a heated storage location is unavailable or when external power is not available.

SUMMARY

According to a first embodiment of the present disclosure, an electric motor includes a case, a stator having a stator lamination and end-windings, and a rotor coupled to the case via at least one rotor bearing. The rotor includes a hollow cylindrical body, a first shaft portion, a second shaft portion and a plurality of fluid exit ports. The hollow cylindrical body includes an inner wall, an outer wall, a first distal end, and a second distal end. The first shaft portion couples to the first distal end of the hollow cylindrical body. In alternate embodiments, the electric motor is an induction motor. The second shaft portion couples to the second distal end of the hollow cylindrical body and includes a fluid feed tube formed therewith having a fluid receive end and a fluid feed end, the fluid feed end extending to a central inner portion of the hollow cylindrical body. The plurality of fluid exit ports resides adjacent the first distal end and the second distal end of the hollow cylindrical body and are configured to spray fluid onto at least the end-windings of the stator.

With the rotor structure of the electric motor, a fluid, e.g., oil, serves to heat or cool the rotor during operation. Further, with the rotor structure of the electric motor, the cooling fluid also serves to heat or cool the end-windings of the stator and/or the stator lamination. With the fluid flow caused by the structure of the rotor of the present disclosure, a single mechanism supports both rotor cooling and stator end-winding cooling.

The electric motor may include a number of additional features and structures. These features and structures may be included in various combinations that include some of these features and structures, all of these features and structures, or one of these features and structures. The electric motor may include a drive motor fluid pump configured to pump the fluid into the fluid receive end of the fluid feed tube.

The fluid feed end of the fluid feed tube may include a plurality of fluid spray ports formed in the second shaft portion and configured to spray fluid onto the inner wall of the hollow cylindrical body. With the electric motor, a distance from the central inner portion of the hollow cylindrical body to the plurality of fluid exit ports may be based upon a specified fluid film thickness to support rotor cooling.

The electric motor may include a cylindrical laminated stack that includes a plurality of permanent magnets coupled to the outer wall of the hollow cylindrical body. The electric motor may include a drive motor fluid pump having a drive motor fluid pump outlet and a drive motor fluid pump inlet. The electric motor may further include fluid circulation piping having an output portion coupled between the drive motor fluid pump outlet and the fluid receive end of the second shaft portion, an input portion coupled between a fluid collection point on the case and the drive motor fluid pump inlet and drive motor fluid pump electronics. The electric motor may further include a radiator configured to cool the fluid. The electric motor may further include a heat exchanger coupled between the drive motor fluid pump and the radiator.

According to a second embodiment of the present disclosure, a method for operating an electric motor includes pumping fluid into a hollow cylindrical body of a rotor via a fluid feed tube that is oriented along an axis of rotation of the rotor. The method further includes spraying the fluid from a plurality of fluid exit ports of the fluid feed tube onto an inner wall of the hollow cylindrical body of the rotor, the fluid further flowing along an inner wall of the hollow cylindrical body from a central portion towards fluid exit ports located adjacent distal ends of the hollow cylindrical body. The method then includes spraying the fluid from the fluid exit ports onto at least end-windings of a stator of the electric motor.

The method serves to heat or cool the rotor, the stator laminate and/or the end-windings of the stator. With the fluid flow of this method, a single operation supports both rotor heating/cooling, stator laminate heating/cooling, and stator end-winding heating/cooling.

The method of operating the electric motor may include a number of additional operations and/or features. These operations and/or features may be included in various combinations that include some of these operations and/or features, all of these operations and/or features, or one of these operations and/or features. The method may include spraying the fluid from the plurality of fluid exits ports onto the inner wall of the hollow cylindrical body by spraying the fluid onto a central portion of the inner wall of the hollow cylindrical body. The fluid flows along the inner wall of the hollow cylindrical body to the plurality of fluid exit ports. With the method, a distance from the central inner portion of the hollow cylindrical body to the plurality of fluid exit ports may be based upon a specified fluid film thickness to support rotor heating/cooling.

The method may further include circulating the fluid from the electric motor to a heat exchanger, cooling the fluid by the heat exchanger, and circulating the fluid from the heat exchanger to the electric motor. The method may further include circulating coolant between a radiator and the heat exchanger. The method may additionally include circulating the coolant between the heat exchanger and a battery. Further, the method may include adjusting flow of the fluid based upon a temperature of the rotor, coolant temperature, coolant flow, rotor speed, and electric motor torque, among other parameters.

BRIEF DESCRIPTION OF THE SEVERAL VIEWS OF THE DRAWINGS

FIGS. 5A and 5B illustrate a rotor according to a representative embodiment, detailing the construct of fluid exit ports within a hollow central portion of the rotor.

DETAILED DESCRIPTION OF THE DISCLOSURE

Figure 1:
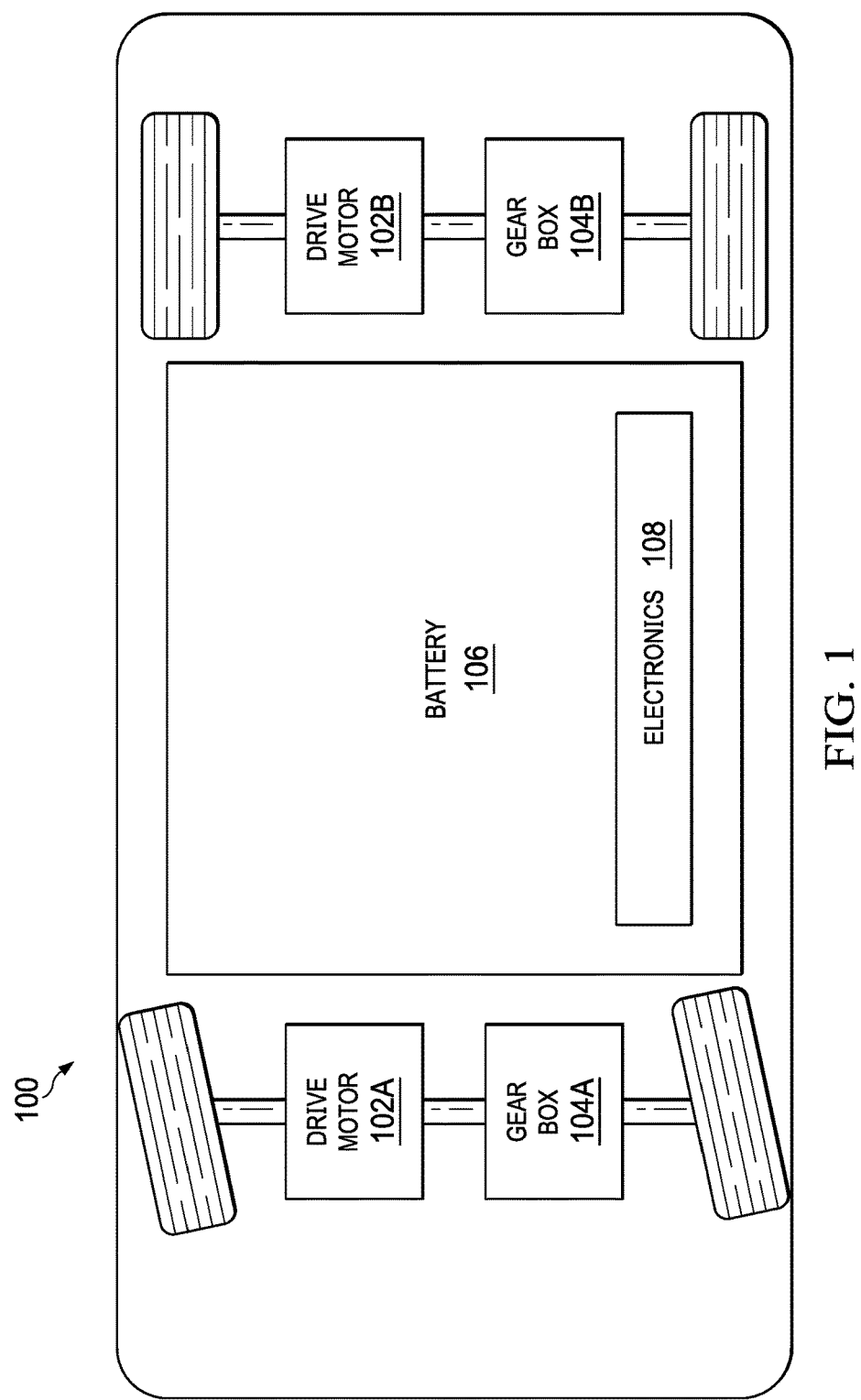
FIG. 1 illustrates the basic components of a battery powered electric vehicle.

FIG. 1 illustrates the basic components of a battery powered electric vehicle (electric vehicle) 100. The electric vehicle 100 includes at least one drive motor (traction motor) 102A and/or 102B, at least one gear box 104A and/or 104B coupled to a corresponding drive motor 102A and/or 102B, a battery 106 and electronics 108 (including drive motor electronics). Generally, the battery 106 provides electricity to the electronics 108 of the electric vehicle 100 and to propel the electric vehicle 100 using the drive motor 102A and/or 102B. The electric vehicle 100 includes a large number of other components that are not described herein but known to one or ordinary skill. While the construct of the electric vehicle 100 of FIG. 1 is shown to have four wheels, differing electric vehicles may have fewer or more than four wheels. Further, differing types of electric vehicles 100 may incorporate the inventive concepts described herein, including motor cycles, aircraft, trucks, boats, train engines, among other types of vehicles.

Various operational issues with the electric vehicle 100 are described herein in conjunction with various embodiments. One of these operational issues relates to the cooling of the drive motor 102A or 102B. Another of these operational issues relates to control of operating temperature of the battery 106. Subsequent description herein may relate back to the components of this FIG. 1. Common numbering may be used to refer to components identified in further FIGs. described herein.

Figure 2:
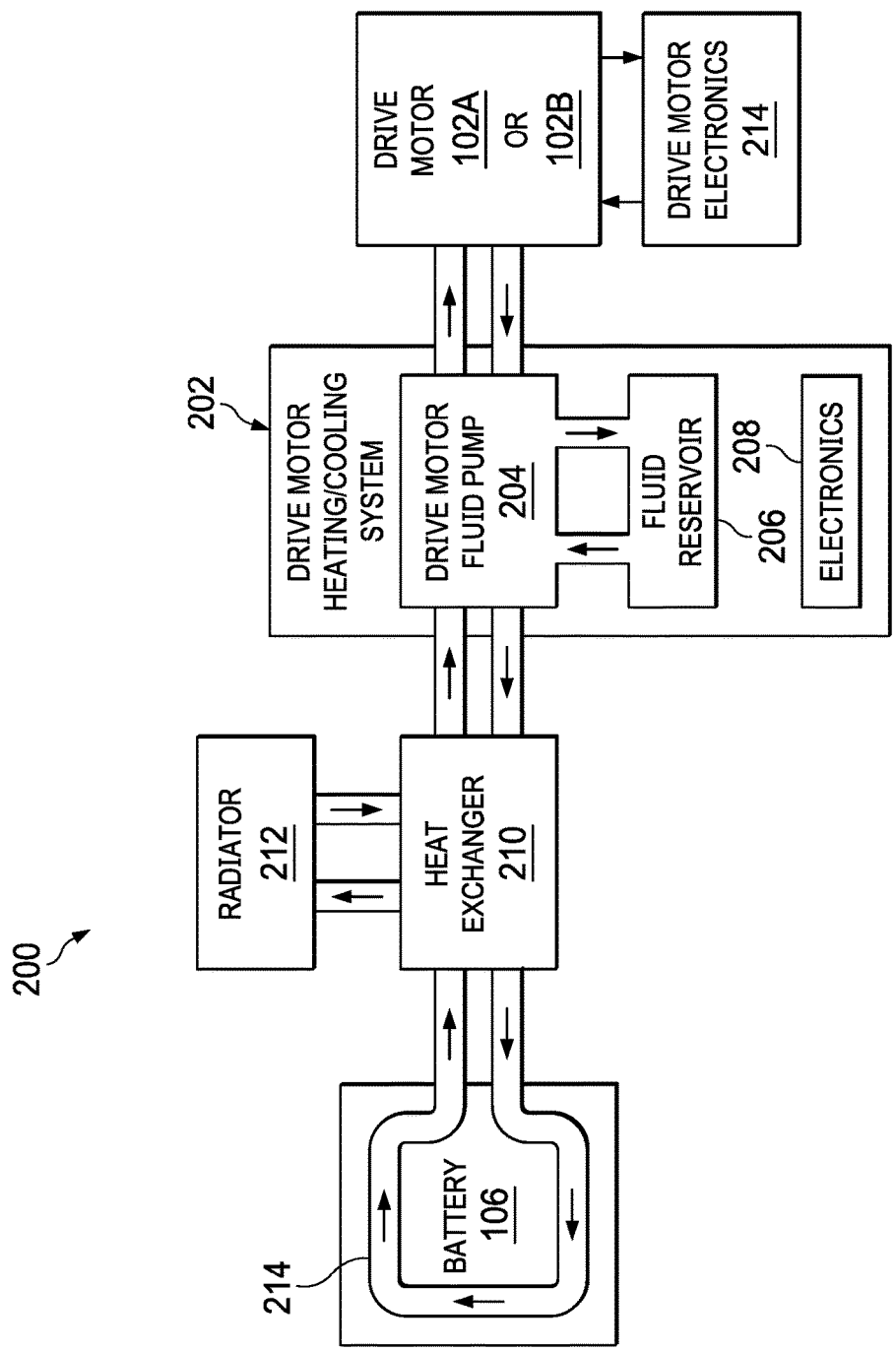
FIG. 2 illustrates components of a drive motor and battery thermal management system, both constructed and operating according to a disclosed embodiment.

FIG. 2 illustrates components of a drive motor and battery thermal management system 200, both constructed and operating according to a disclosed embodiment. The drive motor and battery thermal management system 200 includes a drive motor thermal management system 202 having one or more drive motor fluid pumps 204, a fluid reservoir 206 and electronics 208. In the illustrated embodiment, the fluid is oil, e.g., automatic transmission oil, lubricating oil, or similar oil. In other embodiments, other types of fluid may be used. The drive motor fluid pump 204 pumps fluid between the drive motor 102A and/or 102B, the fluid reservoir 206, and a heat exchanger 210. In one embodiment, the heat exchanger 210 exchanges heat from or to the fluid with water or glycol based coolant and routes the water or glycol based coolant to a radiator 212 for cooling. The heat exchanger 210 may include another pump to circulate the water or glycol based coolant to battery 106 via coolant tubes 214. In other embodiments, the drive motor fluid pump 204 may couple directly to the coolant tubes 214 of the battery 106 and/or to the radiator 212 when a common fluid is used. The drive motor fluid pump 204 is controlled by electronics 208, which may include a digital computer, memory, and/or data processing and controlling components. The drive motor fluid pump 204 may include control valves to control flow of fluid between the drive motor 102A and/or 102B, the reservoir 206, and the heat exchanger 210 (and battery 106 coolant tubes 214 in other embodiments). The heat exchanger 210 may also include valves to direct the flow of coolant to the battery 106 coolant tubes 214 and to the radiator 212, under control of electronics 208 in some embodiments.

Further illustrated in FIG. 2 are drive motor electronics 216 that receive electrical power from the battery 106 and power the drive motor 102A and/or 102B. The drive motor electronics 216 include power electronics and control electronics. The power electronics may include an inverter to drive a stator of the drive motor 102A and/or 102B. The control electronics may include processing circuitry and memory. The processing circuitry may be a central processing unit, customized control circuitry, or other circuitry that is configured to execute software instructions and process data. The memory may include RAM, ROM, DRAM, static RAM, flash RAM, flash ROM, or another type of memory capable of storing software instructions and/or data.

Figure 3:
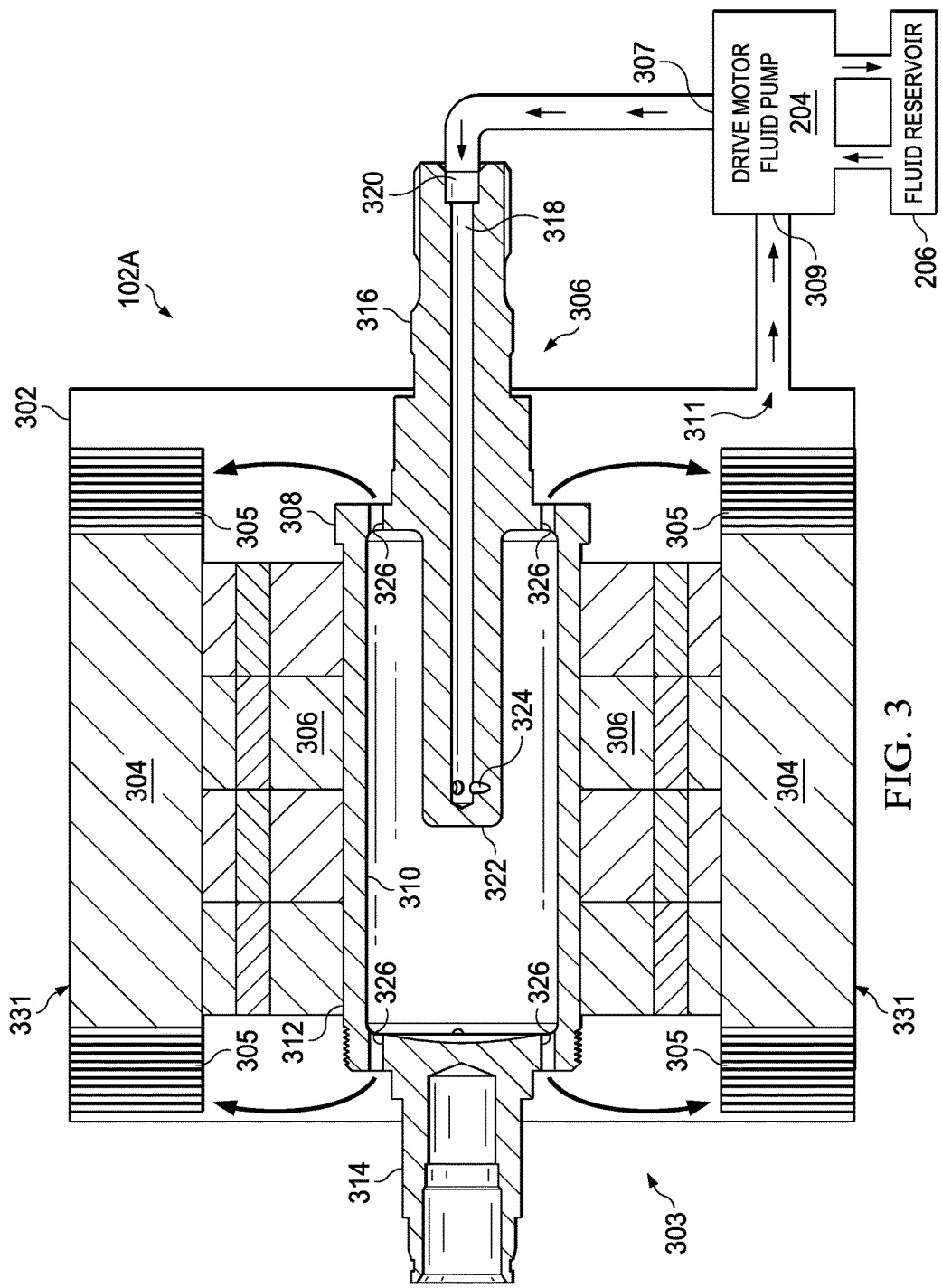
FIG. 3 illustrates components of a drive motor and a portion of the components of a drive motor thermal management system according to a disclosed embodiment.

FIG. 3 illustrates components of a drive motor 102A (or 102B) and a portion of the components of a drive motor thermal management system 200 according to a disclosed embodiment. The drive motor 102A includes a case 302, a stator 331 coupled to the case 302 that includes a stator lamination 304 and end-windings 305, stator drive electronics (not shown), at least one rotor bearing coupled to the case (not shown in FIG. 3), and a rotor 303 coupled to the case 302 via at least one rotor bearing. The rotor 303 includes a hollow cylindrical body 308 having an inner wall 310, an outer wall 312, a first distal end, and a second distal end. The rotor 303 also includes a first shaft portion 314 coupled to a first distal end of the hollow cylindrical body 308 and a second shaft portion 316 coupled to a second distal end of the hollow cylindrical body 308. The second shaft portion 316 includes a fluid feed tube 318 formed therewith having a fluid receive end 320 and a fluid feed end 322. The fluid feed end 322 extends to a central inner portion of the hollow cylindrical body 308. The fluid feed end 322 of the second shaft portion 316 includes a plurality of fluid spray ports 324 configured to spray fluid onto the inner wall 310 of the hollow cylindrical body 308. The rotor 303 also includes a plurality of fluid exit ports 326 formed adjacent the first distal end and second distal end of the hollow cylindrical body 308.

A distance from the inner wall 310 of the hollow cylindrical body 308 to the plurality of fluid exit ports 326 is based upon a specified fluid thickness to support rotor cooling while the rotor 303 rotates, e.g., when the motor 102A is causing movement of a serviced vehicle 100 or while the rotor is stationary. Such specified fluid thickness is based upon viscosity of the fluid, rotational velocity of the rotor 303, and temperature of the fluid. The relationship between the inner wall 310, the plurality of fluid exit ports 326, and the specified fluid thickness will be described further with reference to FIGS. 4 and 5.

The rotor 303 also includes a cylindrical laminated stack 306 coupled to the outer wall 312 of the hollow cylindrical body 308. The cylindrical laminated stack 306 includes a plurality of permanent magnets and insulating material. The stator 331 includes a plurality of stator windings (not shown) that are intercoupled by the stator end-windings 305. In alternate embodiments, the electric motor is an induction motor.

The drive motor fluid pump 204 (each drive motor fluid pump when there are multiple drive motor fluid pumps) has a drive motor fluid pump output 307 and a drive motor fluid pump input 309. The drive motor cooling system 200 includes fluid circulation piping having an output portion coupled between the drive motor fluid pump output 307 and the fluid receive end 320 of the rotor second shaft portion 316. Further, the fluid circulation piping includes an input portion coupled between a fluid collection opening 311 in the case 302 and the drive motor fluid pump input 309. The drive motor fluid pump electronics 208 direct the drive motor fluid pump 204 (and associated valves) to pump fluid from the reservoir 206 into the fluid receive end 320 of the fluid feed tube 318. The fluid is recirculated to the drive motor fluid pump 204 via the fluid collection opening 311 in the case 302. The stator drive electronics and the drive motor fluid pump electronics are designed to operate in an inactive mode, a waste heat mode, and a rotor/stator cooling mode, and a rotor/stator heating mode.

In the waste heat mode, the stator drive electronics provide electrical power to the stator 331 with or without causing rotation of the rotor 303. Further, in the waste heat mode, the drive motor fluid pump 204 may at least substantially fill the hollow cylindrical body 308 with fluid. This waste heat mode operation causes the drive motor fluid pump 204 to circulate fluid on end-windings 305 of the stator 331 to heat the fluid. As will be shown further with reference to FIGS. 6A, 6B, 6C, and 6D, fluid diversion structure(s) may be included to direct the fluid upon the end-windings 305. The fluid may further be directed to the a of the stator to heat the stator lamination 304 for more efficient operation. The waste heat generated from the end-windings 305 of the stator 331 and from the stator lamination 304 is collected by the fluid and circulated to the heat exchanger 210. The heated fluid may then be routed to the coolant tubes 214 of the battery to heat the battery 106. These operations are described further herein with reference to FIG. 7.

In the rotor/stator thermal management mode, the stator drive electronics provide electrical power to the stator 331 to cause rotation of the rotor 303 based upon the power requirements of the driving situation of the electric vehicle 100. Further, the drive motor fluid pump 204 circulates fluid to manage the operating temperature of the rotor 303 and the stator 331 of the electric motor. The drive motor fluid pump 204 circulates the fluid to the heat exchanger 210. The heat exchanger 210 may heat or cool the fluid or use heat from the fluid for battery 106 warming. In another operation, heat from the battery 106 is used to warm the rotor 303 and/or the stator 331.

Figure 4:
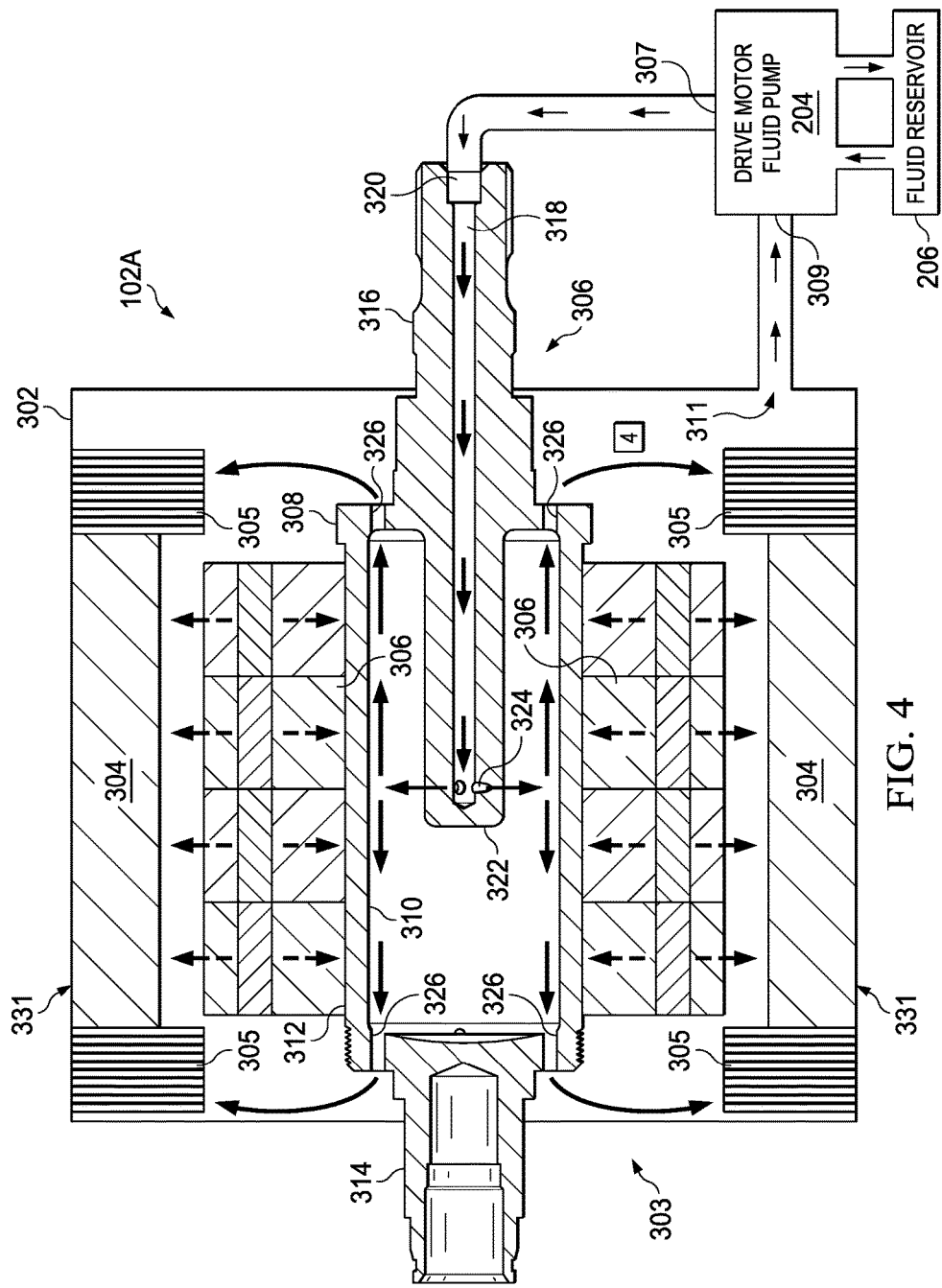
FIG. 4 illustrates components of a drive motor and a portion of the components of a drive motor thermal management system according to a disclosed embodiment, particularly showing the manner in which fluid and heat flow.

FIG. 4 illustrates components of a drive motor 102A and a portion of the components of a drive motor thermal management system according to a disclosed embodiment, particularly showing the manner in which fluid flows. Numbering between FIGS. 3 and 4 is consistent with arrows included in FIG. 4 to illustrate fluid flow and heat flow. Solid arrowed lines in FIG. 4 indicate fluid flow. Dashed arrowed lines indicate heat flow. Note that there is shown to be a gap between the stator lamination 304 and the outer portion of the rotor 303. This gap is exaggerated to illustrate that fluid may flow between the rotor 303 and the stator 331.

Fluid (oil in the embodiment of FIG. 4) enters the fluid feed tube 318 at the fluid receive end 320. The fluid feed tube 318, which may be a forged internal extension of the second shaft portion 316, transports the fluid towards the fluid feed end 322 of the second shaft portion 316. fluid exits the fluid feed tube 318 via fluid spray ports 324 at the fluid feed end 322. The pressure of pumping of the fluid at the fluid feed end 322 and centrifugal force when the rotor 303 is spinning causes the fluid to be received upon the inner wall 310 of the hollow cylindrical body 308. When the rotor 303 is spinning, as indicated at box reference number 3 of FIG. 4, the oil builds up a layer on a central portion of the inner wall 310 and runs along the inner wall 310 towards the fluid exit ports 326. As indicated at box reference number 4 of FIG. 4, the fluid exits the rotor 303 via the fluid exit ports 326 providing constant flow and heat transport.

Note that in FIGS. 3 and 4, the one or more drive motor fluid pumps 204 are not a regular coolant pump. The fluid that the drive motor fluid pump 204 pumps through the rotor 303 cannot be water/glycol fluid, which is not dielectric liquid, but is oil and, thus, the drive motor fluid pump 204 is an oil pump in embodiments described herein. Further, the rotor heating/cooling structure and method described herein may be used with any other stator heating/cooling method. The rotor heating/cooling described herein may be in series or in parallel with one or more stator cooling branches.

FIGS. 5A and 5B illustrate a rotor 303 according to a representative embodiment, detailing the construct of fluid exit ports within a hollow central portion of the rotor 303. As shown, fluid exits the fluid exit ports 326 from the interior of the rotor 303. In the waste heat mode, the drive motor drive motor fluid pump fills the hollow cylindrical body 308 with fluid and the fluid is forced out of the fluid exit ports 326 by the pressure of the pumped fluid when inside the hollow cylindrical body 308.

Referring to all of FIGS. 4, 5A and 5B, during the rotor/stator heating/cooling mode, the centrifugal force caused by the rotor's 303 rotation causes the fluid to form a film on the inner wall 310 of the hollow cylindrical body 308. Thickness of the film as it moves along the inner wall is based upon a distance from the outermost portion of the fluid exit ports 326 and the inner wall 310 as well as fluid properties such as viscosity and temperature, angular velocity of the rotor 303, and other factors. The fluid flows from a central portion of the inner wall 310 to distal portions of the hollow cylindrical body 308 in which the plurality of fluid exit ports 326 are formed. The fluid is at a first temperature when it exits the fluid spray ports 324 and is collected on the inner wall 310 at the central portion. As the fluid flows along the inner wall 310 towards the distal ends of the hollow cylindrical body 308 it collects heat from the rotor 303 and the fluid is at a second temperature, which is higher than the first temperature. Thus, with the structure of the rotor cooling system, more cooling is provided to a central portion of the rotor 303, at which more heat is generated. This benefit results in more uniform temperature control of the rotor 303.

Figure 6A:
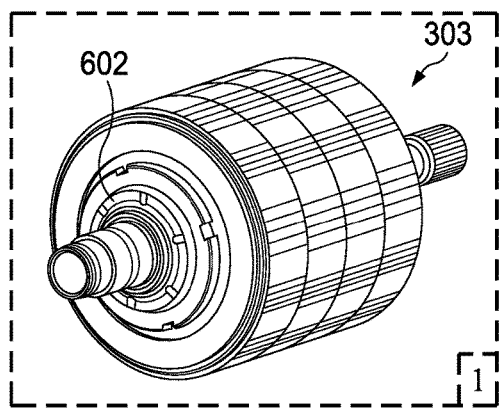
FIGS. 6A, 6B, 6C, and 6D illustrate operation of a drive motor according to one or more embodiments of the present disclosure.
Figure 6B:
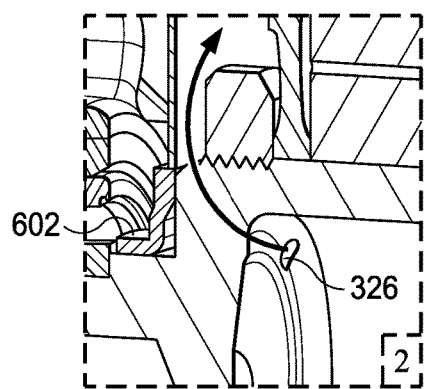
Figure 6C:
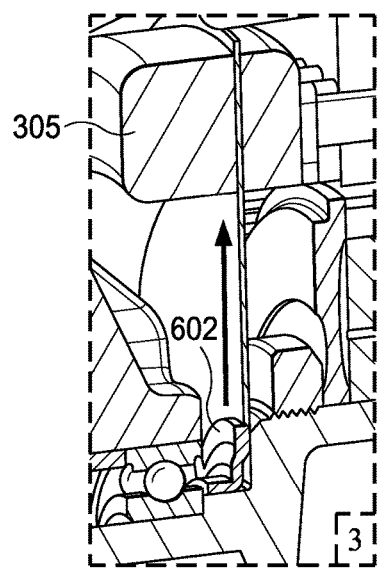
Figure 6D:
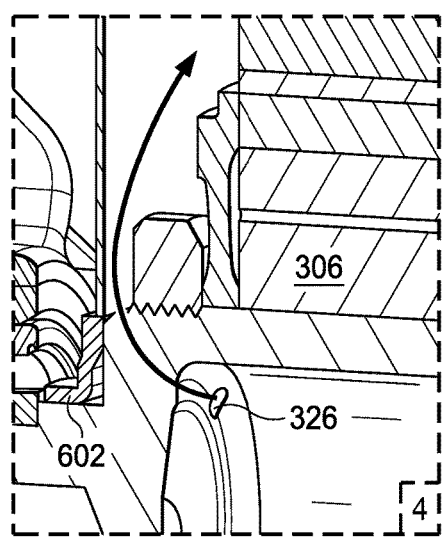

FIGS. 6A, 6B, 6C, and 6D illustrate operation of a drive motor according to one or more embodiments of the present disclosure. The rotor 303 includes at least one oil distribution ring 602 fixed to the rotor 303. The oil distribution ring 602 deflects fluid (oil) exiting the hollow cylindrical body 308 via the fluid exit ports 326 towards the stator end-windings 305. Deflection of the fluid is performed both during the waste heat mode and the rotor/stator cooling mode. FIG. 6A details the oil distribution ring 602 located on a proximal end of the rotor 303. FIG. 6B shows fluid flow (direction of arrow) from the inside of the hollow cylindrical body 308, out of fluid exit port 326, against the oil distribution ring 602, and towards the stator end-windings 305. FIG. 6C illustrates fluid flow from the oil distribution ring 602 towards the stator end-windings 305. FIG. 6D illustrates fluid flow from fluid exit port 326 past the laminated stack 306 towards the stator end-windings 305. With the embodiment of FIG. 6D, fluid is directed from the rotor directly to the end windings 305 without entering the air gap between the rotor and the stator, which would increase drag and reduce efficiency of the electric motor.

Figure 7:
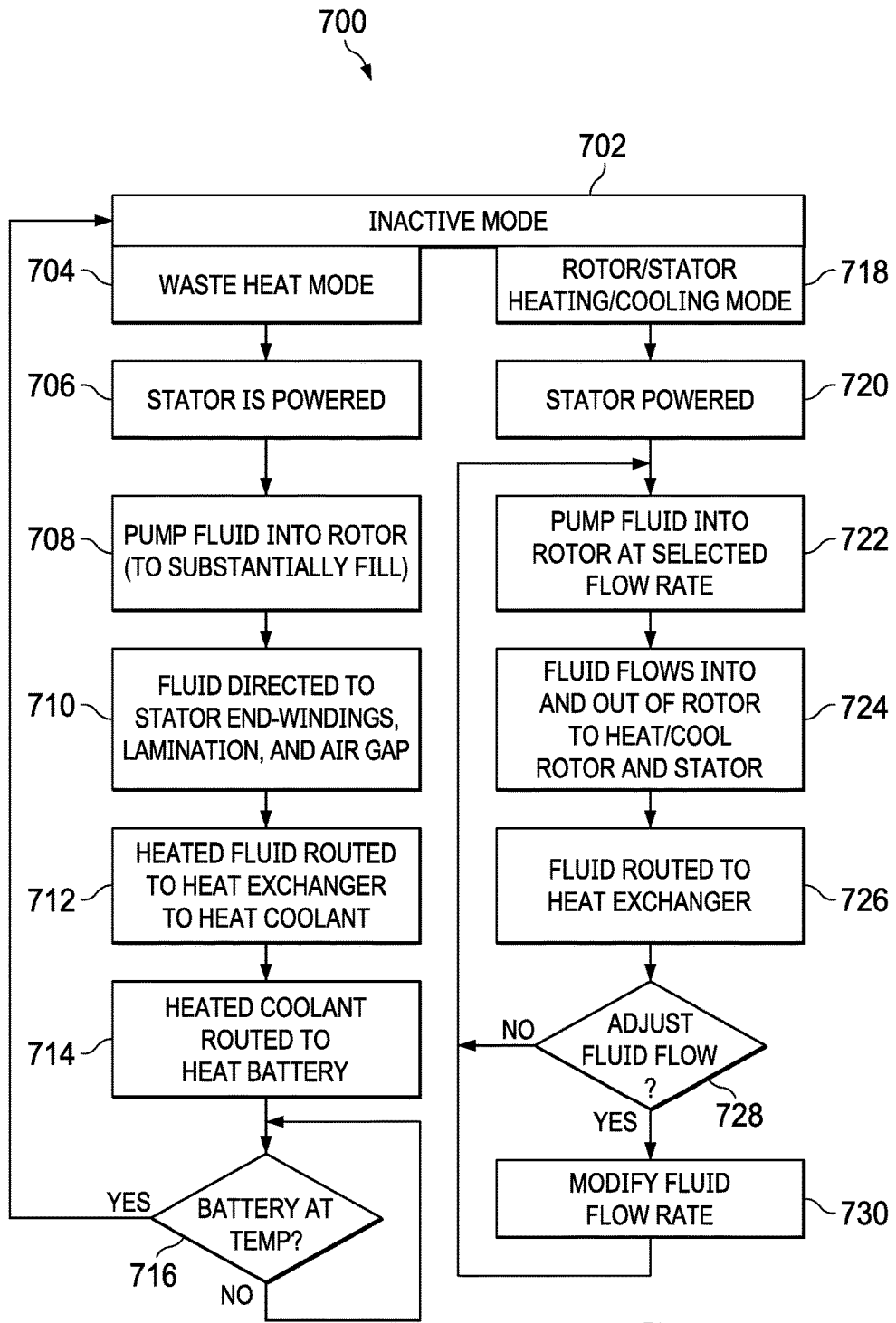
FIG. 7 is a flow diagram illustrating electric motor and battery thermal management operations according to a disclosed embodiment.

FIG. 7 is a flow diagram illustrating electric motor cooling and battery heating operations 700 according to a disclosed embodiment. As shown, the electric motor cooling and battery heating operations include an inactive mode (step 702), a waste heat mode (step 704) and a rotor/stator cooling mode (step 718). The inactive mode (step 702) is used when the electric car is not being used, when the battery 106 is in an acceptable operating temperature range, and/or when the rotor/stator do not require cooling. The waste heat mode (step 704) is enacted when the thermal management of the battery 106 (or another component of the electric vehicle 100) requires warming of the battery 106. In cold locations, the temperature of the battery 106 may be as low as −30 degrees Fahrenheit due to ambient temperature. In order for the battery 106 to be sufficiently functional to drive the electrical vehicle 100, the temperature of the battery 106 must be raised to at least −10 degrees Fahrenheit. The waste heat mode (step 704) serves this purpose.

In waste heat mode, the stator of the electric motor is powered to heat end-windings of the stator (and other portions of the stator 331 as well as the rotor 303) with or without causing the rotor 303 of the electric motor to rotate (step 706). Stator 331 powering without rotor 303 rotation may be accomplished by applying DC voltage/current to the stator windings by the stator drive electronics. Alternately, stator 331 powering without rotor 303 rotation may be accomplished by applying the same AC drive signal to each of the phases of the stator windings. Note that limited rotor 303 rotation may be accomplished by the stator 331 operating inefficiently to cause the rotor 303 to generate heat while rotating. The drive motor fluid pump 204 is then operated to pump fluid into the hollow cylindrical body 308 of the rotor 303 (step 708). Such pumping continues until the hollow cylindrical body 308 is at least substantially filled. By continuing pumping until the hollow cylindrical body 308 is filled, fluid exits the hollow cylindrical body 308 via the fluid exit ports 326 and flows onto the stator end-windings 305, the stator lamination 304, and in the air gap between the rotor 303 and stator 331 where the fluid gathers heat from the contacted components (step 710). The oil distribution ring 602 may assist in directing the fluid onto the stator end-windings 305 and the stator lamination 304. The operation of step 710 may result in the case 302 of the electric motor being at least substantially filled with fluid. The heated fluid is then pumped to heat exchanger 210 to heat coolant circulating therethrough (step 712). The heated coolant is then circulated via the coolant tubes 214 to heat the battery 106 (step 714). The fluid heating and circulation operations are continued until the battery is heated to an acceptable operating temperature (as determined at step 716). Once the battery is heated to the acceptable operating temperature, operation returns to the inactive mode (step 702).

The waste heat mode may commence with first warming the drive motor fluid pump 204 and fluid to an acceptable operating temperature. In one embodiment, the drive motor fluid pump 204 is submerged in the fluid reservoir 206 and acts as a small heater for the fluid. In such case, the drive motor fluid pump 204 is operated very inefficiently to produce only heat and to produce enough torque to move locally the fluid through the system. A goal in this operation is to transfer heat from the drive motor fluid pump 204 to the fluid as quickly as possible. Once the drive motor fluid pump 204 and fluid are warmed, the waste heat mode may continue to warm the battery 106. Local hot spots allow to drive motor fluid pump 204 to suck in fluid and around the drive motor fluid pump 204 into the downstream cooling and lubrication system by sucking cold oil in at the same time. This cold oil will be heated up subsequently, which will raise the fluid temperature even faster to continue with the waste heat mode.

The waste heat mode operations 704 of FIG. 7 may be performed using differing rotor and stator structures than those described previously herein. For example, a differing fluid feed tube structure may be used to feed the fluid into the hollow cylindrical body 308 of the rotor. In such example, the fluid feed tube may be separate from the shaft of the rotor. Further, differing structure may be employed for the fluid to exit the hollow cylindrical body 308 of the rotor and/or to be directed onto the end-windings 305 of the stator and the stator lamination 304.

In the rotor/stator cooling mode (step 718), the stator is at least partially enabled to rotate the rotor as required to propel the electric vehicle 100 (step 720). Fluid is pumped into the hollow cylindrical body 308 by the drive motor fluid pump 204 at a selected flow rate (step 722). The fluid flows along the inner wall 310 of the hollow cylindrical body 308 towards the distal ends of the hollow cylindrical body 308, collecting heat from the rotor 303 along the way, and then exits the hollow cylindrical body 308 via the fluid exit ports 326 towards the end-windings 305 of the stator, the stator lamination 304, and the air gap between the rotor 303 and the stator 331 (step 724). The fluid is then optionally routed to the heat exchanger 210 for heating/cooling of the fluid (step 726). If a flow rate adjustment is necessary to alter the cooling rate (as determined at step 728), the fluid flow rate is modified (step 730). If not, operation returns to step 722. The rotor/stator heating/cooling mode is ceased when the car ceases operations or if the rotor/stator no longer needs heating/cooling.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Routines, methods, steps, operations, or portions thereof described herein may be implemented through electronics, e.g., one or more processors, using software and firmware instructions. A "processor" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the invention.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application.

The invention claimed is:

1. An electric motor comprising:
   a case;
   a stator that includes a stator lamination and end-windings; and
   a rotor coupled to the case via at least one rotor bearing, the rotor comprising:
   a hollow cylindrical body having an inner wall, an outer wall, a first distal end, and a second distal end;
   a first shaft portion coupled to the first distal end of the hollow cylindrical body;
   a second shaft portion coupled to the second distal end of the hollow cylindrical body, the second shaft portion including a fluid feed tube formed therewith having a fluid receive end and a fluid feed end, the fluid feed end extending to a central inner portion of the hollow cylindrical body; and
   a plurality of fluid exit ports adjacent the first distal end and the second distal end of the hollow cylindrical body configured to spray fluid onto at least the end-windings of the stator.

2. The electric motor of claim 1, further comprising:
at least one drive motor fluid pump configured to pump the fluid into the fluid receive end of the fluid feed tube; and
a fluid reservoir.

3. The electric motor of claim 1, wherein the fluid feed end of the fluid feed tube comprises a plurality of fluid spray ports formed in the second shaft portion and configured to spray fluid onto the inner wall of the hollow cylindrical body.

4. The electric motor of claim 1, further comprising a cylindrical laminated stack coupled to the outer wall of the hollow cylindrical body and including a plurality of permanent magnets.

5. The electric motor of claim 1, wherein a distance from the central inner portion of the hollow cylindrical body to the plurality of fluid exit ports is based upon a specified fluid film thickness to support rotor cooling.

6. The electric motor of claim 1, further comprising:
a drive motor fluid pump having a drive motor fluid pump outlet and a drive motor fluid pump inlet;
fluid circulation piping having:
an output portion coupled between the drive motor fluid pump outlet and the fluid receive end of the second shaft portion;
an input portion coupled between a fluid collection point on the case and the drive motor fluid pump inlet; and
drive motor fluid pump electronics.

7. The electric motor of claim 6, further comprising a radiator configured to cool the fluid.

8. The electric motor of claim 7, further comprising a heat exchanger coupled between the drive motor fluid pump and the radiator.

9. A rotor for use with a stator having a stator lamination and end-windings, the rotor comprising:
a hollow cylindrical body having an inner wall, an outer wall, a first distal end, and a second distal end;
a first shaft portion coupled to the first distal end of the hollow cylindrical body;
a second shaft portion coupled to the second distal end of the hollow cylindrical body, the second shaft portion including a fluid feed tube formed therewith having a fluid receive end and a fluid feed end, the fluid feed end extending to a central inner portion of the hollow cylindrical body; and
a plurality of fluid exit ports adjacent the first distal end and the second distal end of the hollow cylindrical body configured to spray fluid onto at least the end-windings of the stator.

10. The rotor of claim 9, further comprising at least one rotor bearing that rotatingly couple the rotor to the stator.

11. The rotor of claim 9, wherein the fluid feed end of the fluid feed tube comprises a plurality of fluid spray ports formed in the second shaft portion and configured to spray fluid onto the inner wall.

12. The rotor of claim 9, further comprising a cylindrical laminated stack coupled to the outer wall of the hollow cylindrical body and including a plurality of permanent magnets.

13. The rotor of claim 9, wherein a distance from the central inner portion of the hollow cylindrical body to the plurality of fluid exit ports is based upon a specified fluid film thickness to support rotor cooling.

14. A method for operating an electric motor comprising:
pumping fluid into a hollow cylindrical body of a rotor via a fluid feed tube that is oriented along an axis of rotation of the rotor;
spraying the fluid from a plurality of fluid exit ports of the fluid feed tube onto an inner wall of the hollow cylindrical body of the rotor, the fluid further flowing along the inner wall of the hollow cylindrical body from a central portion towards fluid exit ports located adjacent distal ends of the hollow cylindrical body while the rotor is rotating; and
spraying the fluid from the fluid exit ports onto at least end-windings of a stator of the electric motor.

15. The method of claim 14, wherein spraying the fluid from the plurality of fluid exits ports onto the inner wall of the hollow cylindrical body comprises spraying the fluid onto a central portion of the inner wall of the hollow cylindrical body.

16. The method of claim 15, wherein a distance from the central inner portion of the hollow cylindrical body to the plurality of fluid exit ports is based upon a specified fluid film thickness to support rotor cooling.

17. The method of claim 14, further comprising:
circulating the fluid from the electric motor to a heat exchanger;
exchanging heat between the fluid and the heat exchanger; and
circulating the fluid from the heat exchanger to the electric motor.

18. The method of claim 17, further comprising circulating coolant between a radiator and the heat exchanger.

19. The method of claim 18, further comprising circulating the coolant between the heat exchanger and a battery.

20. The method of claim 14, further comprising adjusting flow of the fluid based upon at least a temperature of the rotor.

* * * * *